United States Patent
Sorkine-Hornung

(10) Patent No.: US 9,412,172 B2
(45) Date of Patent: Aug. 9, 2016

(54) SPARSE LIGHT FIELD REPRESENTATION

(71) Applicant: DISNEY ENTERPRISES, Inc., Burbank, CA (US)

(72) Inventor: Alexander Sorkine-Hornung, Zurich (CH)

(73) Assignee: DISNEY ENTERPRISES, INC., Burbank, CA (US)

(*) Notice: Subject to any disclaimer, the term of this patent is extended or adjusted under 35 U.S.C. 154(b) by 367 days.

(21) Appl. No.: 13/944,437

(22) Filed: Jul. 17, 2013

(65) Prior Publication Data
US 2014/0328535 A1 Nov. 6, 2014

Related U.S. Application Data

(60) Provisional application No. 61/820,104, filed on May 6, 2013.

(51) Int. Cl.
G06T 9/00 (2006.01)
G06T 7/00 (2006.01)
G06T 5/00 (2006.01)

(52) U.S. Cl.
CPC .............. G06T 7/0065 (2013.01); G06T 5/00 (2013.01); G06T 2200/21 (2013.01); G06T 2207/10052 (2013.01)

(58) Field of Classification Search
CPC ............... G06T 7/0065; G06T 2207/10052
See application file for complete search history.

(56) References Cited

U.S. PATENT DOCUMENTS

| | | | |
|---|---|---|---|
| 8,619,082 B1* | 12/2013 | Ciurea et al. | 345/427 |
| 8,988,317 B1* | 3/2015 | Liang | G06T 15/00 345/32 |
| 9,113,043 B1* | 8/2015 | Kim | H04N 13/02 |
| 9,165,401 B1* | 10/2015 | Kim | G06T 15/50 |
| 2002/0126116 A1* | 9/2002 | Grzeszczuk | G06T 15/00 345/420 |
| 2004/0249615 A1* | 12/2004 | Grzeszczuk | G06F 17/16 703/2 |
| 2014/0327674 A1* | 11/2014 | Sorkine-Hornung | G06T 7/0065 345/426 |

OTHER PUBLICATIONS

Bolles, Robert C., H. Harlyn Baker, and David H. Marimont. "Epipolar-plane image analysis: An approach to determining structure from motion." International Journal of Computer Vision 1.1 (1987): 7-55.*

(Continued)

*Primary Examiner* — Stephen R Koziol
*Assistant Examiner* — Jonathan S Lee
(74) *Attorney, Agent, or Firm* — Patterson & Sheridan, LLP

(57) ABSTRACT

The disclosure provides an approach for generating a sparse representation of a light field. In one configuration, a sparse representation application receives a light field constructed from multiple images, and samples and stores a set of line segments originating at various locations in epipolar-plane images (EPI), until the EPIs are entirely represented and redundancy is eliminated to the extent possible. In addition, the sparse representation application determines and stores difference EPIs that account for variations in the light field. Taken together, the line segments and the difference EPIs compactly store all relevant information that is necessary to reconstruct the full 3D light field and extract an arbitrary input image with a corresponding depth map, or a full 3D point cloud, among other things. This concept also generalizes to higher dimensions. In a 4D light field, for example, the principles of eliminating redundancy and storing a difference volume remain valid.

16 Claims, 5 Drawing Sheets
(2 of 5 Drawing Sheet(s) Filed in Color)

(56) References Cited

OTHER PUBLICATIONS

Criminisi, Antonio, et al. "Extracting layers and analyzing their specular properties using epipolar-plane-image analysis." Computer vision and image understanding 97.1 (2005): 51-85.*

Kim, Changil. "Scene Reconstruction from a Light Field." (2010).

Kubota, Akira, Kiyoharu Aizawa, and Tsuhan Chen. "Reconstructing dense light field from array of multifocus images for novel view synthesis." Image Processing, IEEE Transactions on 16.1 (2007): 269-279.*

Kubota, Akira, Kiyoharu Aizawa, and Tsuhan Chen. "Reconstructing dense light field from array of multifocus images for novel view synthesis." Image Processing, IEEE Transactions on 16.1 (2007): 269-279.*

Soukup, Daniel, et al. "Depth Estimation within a Multi-Line-Scan Light-Field Framework." Advances in Visual Computing. Springer International Publishing, 2014. 471-481.*

Vagharshakyan, Suren, Robert Bregovic, and Atanas Gotchev. "Image based rendering technique via sparse representation in shearlet domain." Image Processing (ICIP), 2015 IEEE International Conference on. IEEE, 2015.*

Globally Consistent Depth Labeling of 4D Light Fields.*

Changil Kim et al: "Scene reconstruction from high spatio-angular resolution light fields", ACM Transactions on Graphics, vol. 32, No. 4, Jul. 2013, p. 1.

Marcus Magnor et al: "Multi-View Image Coding with Depth Maps and 3-D Geometry for Prediction", SPIE Conference Proceedings: Visual Communications and Image Processings, Jan. 2001, pp. 271-273.

Sven Wanner et al: "Generating EPI Representations of 4D Light Fields with a Single Lens Focused Plenoptic Camera", Sep. 26, 2011, Advances in Visual Computing Springer Berlin Heidelberg, Berlin, Heidelberg, pp. 90-101.

Stewart, J. et al: "A New Reconstruction 1-15 Filter for Undersampled Light Fields", Proceedings of the 14th Eurographics Workshop on Rendering (EGRW '03). Eurographics Association, Aire-La-Ville, Switzerland, Switzerland, 2003, pp. 150-156.

Isaksen, A. et al: "Dynamically Reparameterized Light Fields", Proceedings of the 27th Annual Conference on Computer Graphics and Nteractive Techniques (SIGGRAPH '00). ACM Press/Addison-Wesley Publishing Co., New York, NY, USA, 2000.

European Search Report for EP14167199.0, Oct. 24, 2014.

* cited by examiner

A $\Gamma = \{I_1, I_2 ... I_n\} = \{(m_1, u_1, s_1, r_1^T), ...(m_1, u_1, s_1, r_1^T)\}$

+

B

SPARSE LIGHT FIELD REPRESENTATION

CROSS-REFERENCE TO RELATED APPLICATIONS

This application claims priority to U.S. provisional application having Ser. No. 61/820,104, filed on May 6, 2013, which is hereby incorporated by reference in its entirety.

BACKGROUND

1. Field

This disclosure provides techniques for representing light fields and, in particular, a sparse representation of a light field.

2. Description of the Related Art

Light fields are typically constructed from a large set of images of a scene, captured at different viewing positions. One can capture a light field using a single photo diode, an array of cameras, a single camera taking a single image with a coded aperture, etc. At its simplest, the light field may be captured by simply taking a number of photographs.

Light fields having high spatial-angular resolution, such as 3D light fields constructed from hundreds of high resolution 2D images with their respective optical centers distributed along a 1D line or light fields created with a camera array, can take up enormous storage space. In addition, such light fights may be difficult to process efficiently if, for example, the full input light field must be kept in memory.

SUMMARY

One aspect of the disclosure includes a computer implemented method for generating a sparse representation of a light field. The method includes receiving the light field captured as a plurality of images depicting a scene. The method further includes receiving depth estimates of points in the scene, and determining an error between a reconstruction from the depth estimates and the received images. In addition, the method includes storing the depth estimates and the error.

Other aspects include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited aspects are attained and can be understood in detail, a more particular description of aspects of the disclosure, briefly summarized above, may be had by reference to the appended drawings.

It is to be noted, however, that the appended drawings illustrate only typical aspects of this disclosure and are therefore not to be considered limiting of its scope, for the disclosure may admit to other equally effective aspects.

Figure 1:
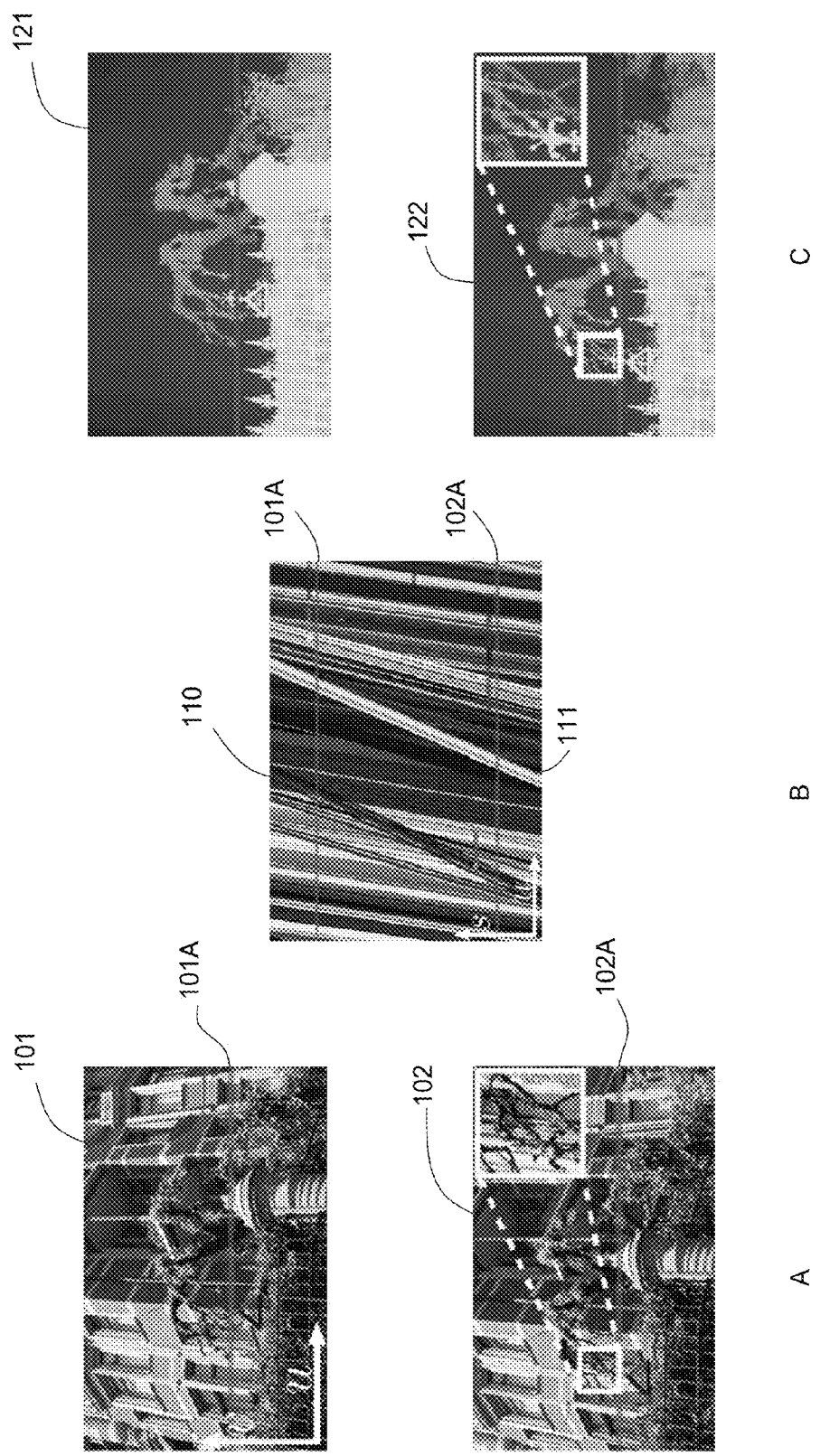

FIG. 1 illustrates an approach for estimating depth from high spatio-angular resolution light fields, according to an aspect of the disclosure.

Figure 2:
Figure 2:
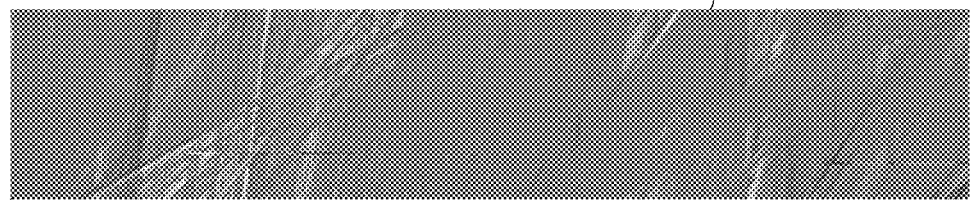

FIG. 2 illustrates a sparse representation for storing light field data, according to an aspect of the disclosure.

Figure 3:
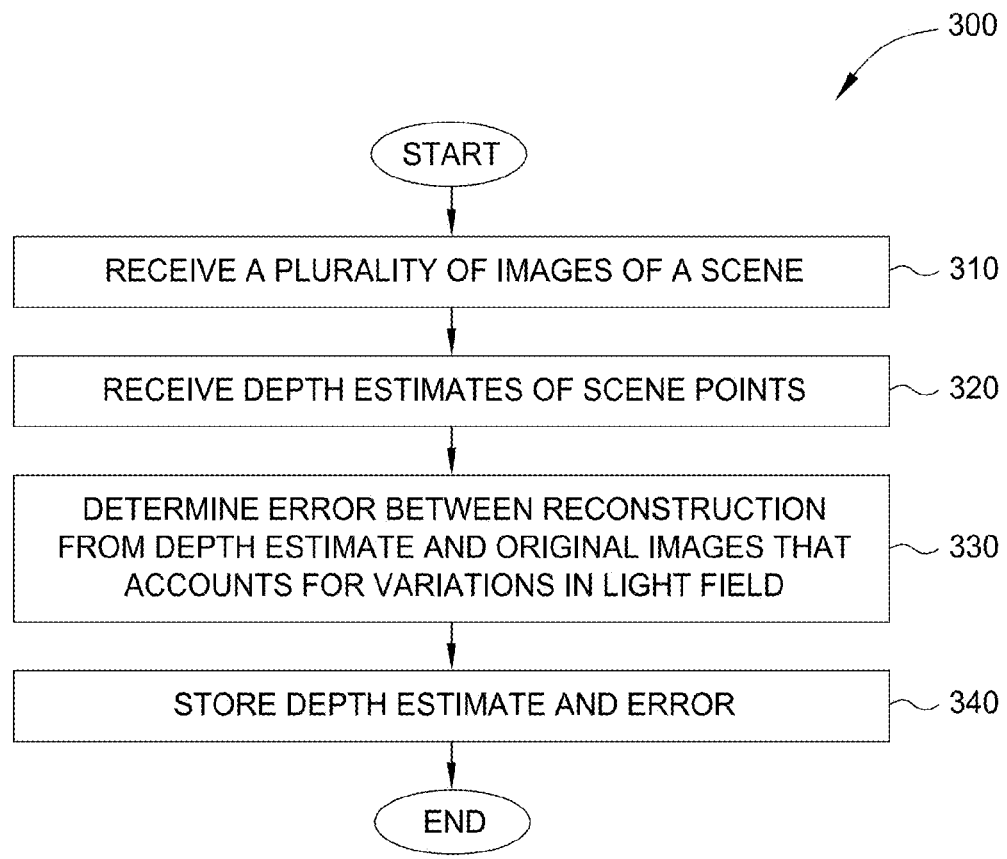

FIG. 3 illustrates a method for storing light field data in a sparse representation format, according to an aspect of the disclosure.

Figure 4:
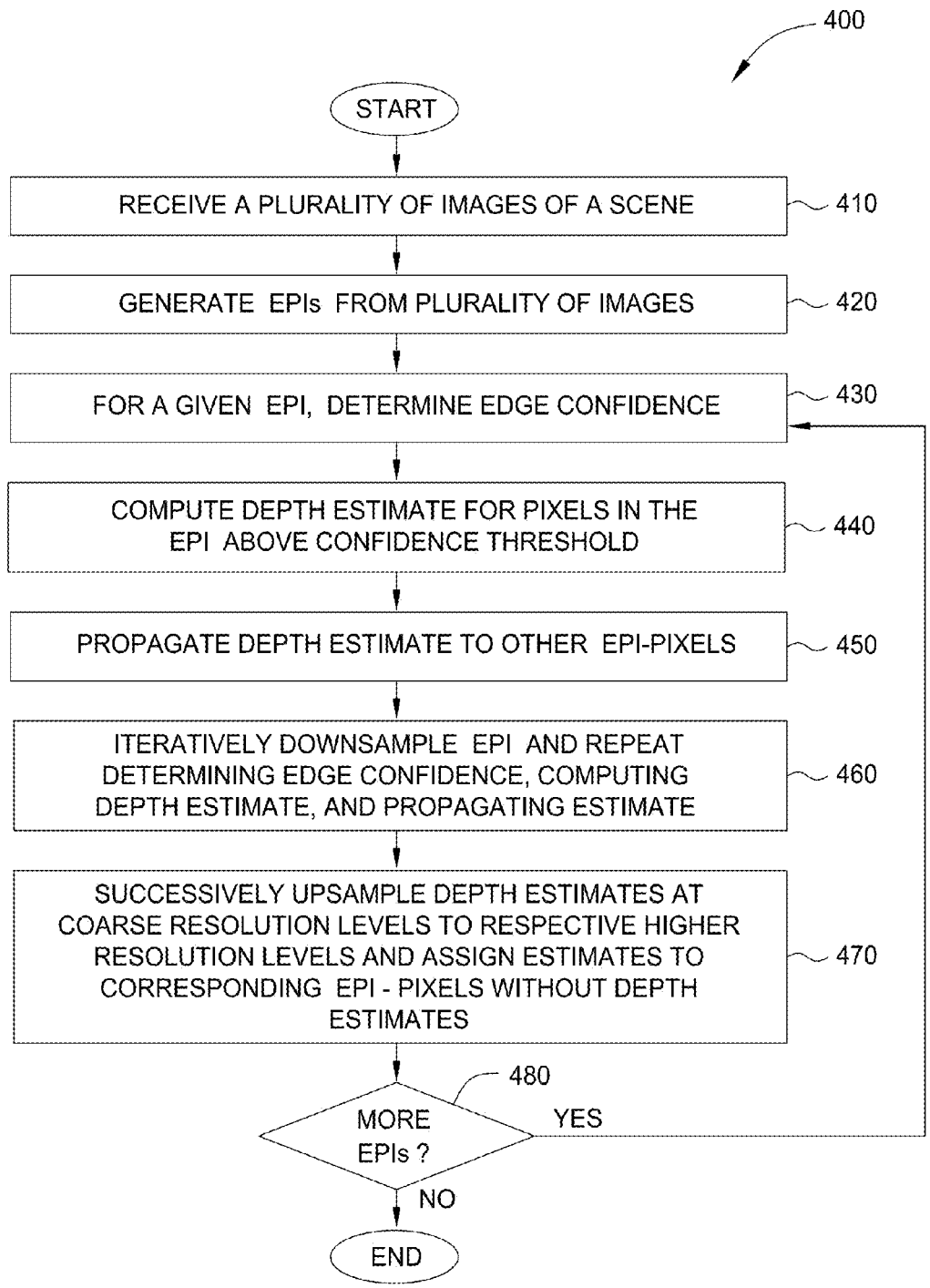

FIG. 4 illustrates a method for estimating depth in a scene, according to an aspect of the disclosure.

Figure 5:
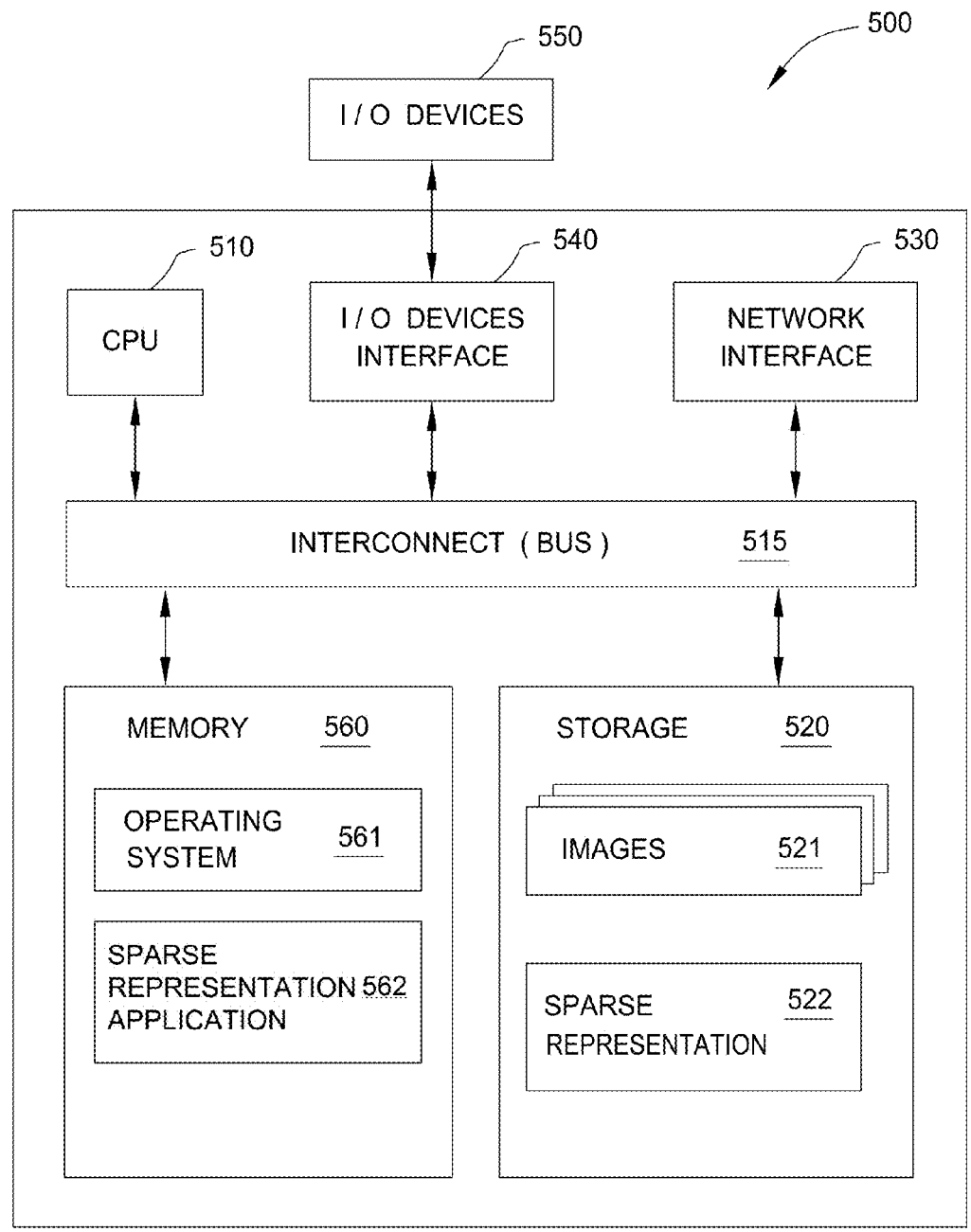

FIG. 5 illustrates a system in which an aspect may be implemented.

DETAILED DESCRIPTION

Aspects disclosed herein provide techniques for storing light field data. Given a light field constructed from multiple images, depth estimates of scene points are stored together with an error between a reconstruction from the depth estimate and the multiple images.

FIG. 1 illustrates an approach for estimating depth from high spatio-angular resolution light fields, according to an aspect of the disclosure. Illustratively, the light field may be a three-dimensional (3D) light field constructed from multiple high-resolution two-dimensional (2D) images with optical centers distributed along a one-dimensional (1D) line. Panel A shows two such 2D images 101, 102, which may be captured in any feasible manner, such as with a camera array, using a camera on a motorized linear stage, etc. As discussed in greater detail below, techniques disclosed herein are also generalizable to higher dimensions (e.g., four-dimensional (4D) input light fields and unstructured light fields).

A 3D light field with radiance values captured in RGB color space may be denoted as a map $L: \mathbb{R}^3 \to \mathbb{R}^3$. The radiance $r \in \mathbb{R}^3$ of a light ray may then be given as $r = L(u, v, s)$, where s describes the 1D ray origin and $(u, v)$ represents the 2D ray direction. Here, s may be interpreted as different camera positions and/or cameras distributed along a 1D line, and $(u, v)$ may be interpreted as pixel coordinates in a corresponding image $I_s(u, v)$. It will be assumed herein, for the sake of simplicity, that $u, v, s$ are regularly and uniformly sampled, i.e., the optical centers are uniformly spaced and all captured images are rectified, so that epipolar lines of a scene point coincide with the same horizontal scanline in all images. One way to achieve such regular and uniform sampling is by mounting a camera on a motorized linear stage, capturing images at a uniform spacing (e.g., 1 cm between camera positions), and approximating a regularly sampled 3D light field by correcting the captured images for lens distortion and compensating for mechanical inaccuracies of the motorized linear stage (by, e.g., estimating the camera poses, computing the least orthogonal distance line from all camera centers as a baseline, and then rectifying all images with respect to the baseline).

A given u-v slice of the light field L for a fixed s corresponds to input image $I_s$, while a u-s slice for a fixed v coordinate corresponds to an "epipolar-plane image" (EPI), which is, intuitively, a stack of the same row v taken from all input images. Panel B illustrates an exemplary EPI 110. As shown in panels A and B, lines 101a, 102a represent both the respective s-parameters of the two input images as well as the v-parameter in the input images from which the EPI 110 is constructed. Note, in panel A the lines 101a, 102a each mark a v coordinate, whereas in panel B the lines each mark an s coordinate.

An EPI will be denoted herein as $E_v: \mathbb{R}^2 \to \mathbb{R}^3$, with radiance $r = E_v(u, s)$ of a ray at a position $(u, s)$. EPIs of 3D light fields may exhibit high ray coherence and include redundant information. The term EPI-pixel $(u, s)$ is used herein instead of the term ray at $(u, s)$ for disambiguation. Further, the subscript v will be omitted for notational simplicity, as techniques disclosed herein consider mostly individual EPIs where the parameter v is fixed.

When the ray space of L is sampled densely enough, each scene point appears as a line segment in an EPI with the slope of the line segment depending on the scene point's depth. Panel B shows examples of such line segments 111, having slopes that depend on depth. Let $\Gamma$ be the set of line segments originating at various locations in the input EPI E. Constructing $\Gamma$ amounts to computing line slopes at the EPI pixels, i.e., estimating the depth of scene points. As discussed in greater detail below, a sparse representation application (not shown) may employ a fine-to-coarse strategy which estimates depth at edges in an EPI at a highest image resolution first. Estimated depths are then propagated throughout the EPI (in s-direction), after which the EPI is iteratively downsampled to coarser resolutions, and depths which were not previously determined are estimated in a similar manner at those coarser resolutions. Note, this depth estimation strategy is optional. Any feasible technique that permits computation of depth estimates may be used, such as other stereo reconstruction methods over multi-view stereo or active scanners (e.g., a Kinect, laser scanner, structured light scanner). The sparse light field representation discussed herein is advantageous in that, even if the depth estimates are wrong, computation of the "difference EPI" still permits the original input images to be represented (the difference EPI simply gets less sparse and compression less good, as it has to compensate for errors of a poor depth estimator).

The estimated depths may be used to produce depth maps, e.g., depth maps 121, 122 illustrated in panel C, which have a number of applications. Aside from generating a 3D model of the scene, the depth maps 121, 122 may be used in automatic segmentation and image-based rendering, among other things. For example, in automatic segmentation such as background removal, pixels within a prescribed depth interval may simply be thresholded. As another example, the scene may be directly visualized using the depth maps as a colored 3D point cloud via splat-based rendering, with the ability to look around occluding objects.

FIG. 2 illustrates a sparse representation for storing light field data, according to an aspect of the disclosure. As discussed, in densely sampled ray spaces, each scene point may appear as a line segment in an EPI, which is a u-s slice of the light field L for a fixed v coordinate. Panel A shows an exemplary EPI 210.

The slope of line segments in the EPI correspond to respective scene points' depths, and EPIs of 3D light fields typically exhibit high coherence and contain redundant information that can be utilized for a more efficient representation. In particular, rather than storing the full EPI, the EPI may be reconstructed by knowing the parameters of line segments. The sparse light field representations disclosed herein utilizes this fact, and further, specifically considers completeness and variation of the represented light field. Completeness of a representation may be compromised where a large amount of captured light rays are occluded in any part of the EPI. Variation in the light field may arise where scene points change their color along their corresponding line segment in the EPI due to specularities or other view-dependent effects. As a result of such occlusions and light field variations, simply collecting and storing line segments and their color along single horizontal lines of the EPI may lack completeness and may not capture the variations in the light field.

Aspects disclosed herein address the issues of occlusions and light field variations discussed above. According to one aspect, a sparse representation application samples and stores a set $\Gamma$ of line segments originating at various locations in the input EPI E, until the entire EPI is represented and redundancy is eliminated to the extent possible, as discussed in greater detail below. In addition, the sparse representation application may determine and store a difference EPI $\Delta E$ that accounts for variations in the light field. More specifically, the slope m of a line segment associated with a scene point at distance z is given by $$m = \frac{1}{d} = \frac{z}{f_x b}, \quad (1)$$

where d is the image space disparity defined for a pair of images captured at adjacent positions or, equivalently, the displacement between two adjacent horizontal lines in the EPI, $f_x$ is the horizontal focal length in pixels and b is the metric distance between each adjacent pair of imaging positions. Correspondingly, an EPI line segment may be compactly described by a tuple $l=(m, u, s, r^T)$, where r is the average color of the scene point in the EPI. $\Gamma$ is then the set of all tuples l. Techniques for generating the tuples l are discussed in greater detail below. Additional tuples may be stored in regions which are occluded, thereby ensuring completeness. From the set $\Gamma$ of line segments, a reconstructed EPI $\hat{E}$ may be generated by rendering the line segments in the order of decreasing slopes, i.e., rendering the scene points from back to front. In one configuration, $\Gamma$ may be stored as an ordered list of tuples ln order of decreasing slopes for efficient EPI reconstruction.

In addition to $\Gamma$, the sparse representation application may determine a difference $\Delta E = E - \hat{E}$ between the input EPI E and the reconstruction $\hat{E}$. Note, the difference $\Delta E$, also referred to herein as the "error," captures the variation and detail information in the light field, such as view dependent effects. Panel B illustrates an exemplary error EPI 220. A high value of $\Delta E$ may occur, e.g., at specularities and at inaccurate slope estimates.

The $\Gamma$ and $\Delta E$ for all EPIs generated from the input images, taken together, compactly store all relevant information that is necessary to reconstruct the full 3D light field as well as extract an arbitrary input image with a corresponding depth map, or a full 3D point cloud, among other things. One such $\Gamma$ and $\Delta E$ 220 pair is shown in panel B. Experience has shown that this sparse representation may be stored using 5-20% of the space required to store some red-green-blue (RGB) EPIs.

FIG. 3 illustrates a method 300 for storing light field data in a sparse representation format, according to an aspect of the disclosure. As shown, at step 310, a sparse representation application receives a plurality of images of a scene, which together form a light field. In one configuration, a 3D light field may be constructed from multiple high-resolution 2D images with optical centers distributed along a 1D line, as discussed above.

At step 320, the sparse representation application receives depth estimates of scene points. Such depth estimates may be made by the sparse representation application itself using the received images (i.e., the depth estimates received are also made by the sparse representation application). However, the depth estimates need not be made by the sparse representation application. For example, the depth estimates may simply be retrieved from a storage location.

In one configuration, estimating depth of scene points may be equivalent to determining the line slopes at EPI pixels. Such line slopes may be used to construct the set $\Gamma$ of tuples $l=(m, u, s, rT)$, which may be an ordered list of tuples ln order of decreasing slopes for efficient EPI reconstruction.

In one configuration, the sparse representation application may employ a fine-to-coarse estimation approach to estimate depth. In such a case, regions where the depth estimation is expected to perform well may first be identified in the full-resolution of an EPI E using an edge confidence test. In one configuration, the sparse representation application may compute edge confidence measures $C_e$ for each EPI-pixel and generate a binary mask $M_e$ having value 1 for pixels for which $C_e$ is greater than a given threshold, and 0 otherwise.

Using binary mask $M_e$, the sparse representation application may generate depth estimates for EPI-pixels with high edge confidence. As discussed in greater detail below, the sparse representation application may, in one configuration, test a number of discrete depth hypotheses d and pick a depth that leads to a highest color density of sampled EPI-pixels. The depth estimate itself is used to improve the initial confidence toward a refined depth confidence $C_d$, which provides a good indicator of the reliability of particular depth estimates. The depth estimate may also be propagated throughout the EPI. This process of depth estimation and propagation may be iterated until all EPI-pixels with high edge confidence have been processed. After one iteration, sufficiently detailed regions at the highest resolution level of the EPI E have a reliable depth value assigned, while the depth in more homogenous regions (which were masked out) remain unknown.

After estimating depth at the full resolution, the sparse representation application may downsample the EPI E to coarser resolutions. At each resolution level, the sparse representation application may determine edge confidence for EPI-pixels which are not yet processed, estimate depths of EPI-pixels with high edge confidence, and propagate the depth estimates. This iterative procedure produces depth estimates for all EPI-pixels, and the procedure may be repeated for all EPIs.

At step 330, the sparse representation application determines an error between a reconstruction from the depth estimates and the input images which accounts for variations in the light field. As discussed, the sparse representation application may estimate (or receive) depth of a scene point as the slope m of a line segment associated with the point at distance z using equation (1), and store each EPI line segment compactly as a tuple $l=(m, u, s, r^T)$, where r is the average color of the scene point in the EPI. Given the set $\Gamma$ of all tuples l, the sparse representation application may compute the error between a reconstructed EPI, having lines defined by the tuples l, and the EPI generated from the input images as the difference $\Delta E = E - \hat{E}$, where $\hat{E}$ is the reconstruction using the set $\Gamma$ of all tuples l. As discussed, a high value of $\Delta E$ may occur, e.g., at specularities and at inaccurate slope estimates.

At step 340, the sparse representation application stores the depth estimates and the error in a storage device. In one configuration, the sparse representation application may store the set $\Gamma$ of all tuples l, as well as the difference EPI $\Delta E$, discussed above. Taken together, the $\Gamma$ and $\Delta E$, for all EPIs generated from the input images, compactly store information needed to reconstruct the full 3D light field, as well as to extract an arbitrary input image with a corresponding depth map, or a full 3D point cloud, among other things. Experience has shown that $\Gamma$ and $\Delta E$ may be stored using 5-20% of the space required to store some red-green-blue (RGB) EPIs. The stored $\Gamma$ and $\Delta E$ may be used to reconstruct the full 3D light field, as well as extract an arbitrary input image with a corresponding depth map, or a full 3D point cloud, among other things.

FIG. 4 illustrates a method 400 for estimating depth in a scene, according to an aspect of the disclosure. As discussed, in one configuration, a sparse representation application may itself estimate depth from received images. Illustratively, the method 400 begins at step 410, where the sparse representation application receives a plurality of images of a scene, which together form a light field. For example, a 3D light field may be constructed, e.g., from multiple high-resolution 2D images with optical centers distributed along a 1D line, as discussed above.

At step 420, the sparse representation application generates EPIs from the plurality of images. For example, for 3D light fields, an EPI may be generated by simply stacking the same row v from all input images as a u-s slice of the light field L for a fixed v coordinate corresponds to an EPI.

For a given EPI, the sparse representation application determines edge confidence at step 430. In one configuration, the sparse representation application may compute the following difference measure:

$$C_e(u,s) = \Sigma_{u' \in N(u,s)} \|E(u,s) - E(u',s)\|^2, \quad (2)$$

where N(u, s) is a 1D window in EPI E around pixel (u, s) and may be a small neighborhood (e.g., 9 pixels), as it may simply measure local color variation. $C_e$ may be fast to compute, and may be thresholded to give a binary confidence mask $M_e$. For example, the threshold may have value 0.02, with the binary confidence mask $M_e$ having value 1 for pixels for which $C_e$ is greater than 0.02, and 0 otherwise. Spurious isolated regions may also be removed by, e.g., applying a morphological opening operator to the mask $M_e$.

At step 440, the sparse representation application computes depth estimates for pixels in the given EPI which are above an edge confidence threshold. Such EPI-pixels with high reliability are stored as tuples ln 1 in the set $\Gamma$ of tuples and, as discussed in greater detail below, propagated throughout the EPI. Where a binary confidence mask $M_e$ is determined, the sparse representation application may compute depth estimates for those EPI pixels marked as confident in $M_e$ to prevent computing depth estimates at ambiguous EPI pixels, thereby speeding up depth computation without sacrificing accuracy. In one configuration, the depth estimates may be computed per scanline of an EPI, i.e., a fixed parameters may be selected and a depth estimate computed for E(u, ŝ) with $M_e(u, \hat{s}) = 1$. In one configuration, the sparse representation application may begin by settings ŝ to a scanline at the center of the EPI, estimate depth for EPI-pixel of that scanline, propagate those estimates as discussed in greater detail below, then set ŝ to the nearest s with respect to the center of the EPI that still has unprocessed pixels, and so forth, until all edge-confident EPI-pixels have been processed or masked out during propagation.

The sparse representation application may assign a depth z, or equivalently a disparity d, to each EPI-pixel (u, ŝ). For a hypothetical disparity d, the set R of radiances or colors of EPI-pixels may be sampled as $$R(u,d) = \{E(u + (\hat{s}-s)d, s) | s = 1, \ldots, n\}, \quad (3)$$

where n is the number of views in the light field. From the density of radiance values in R(u, d), a depth score S(u, d) may be computed in linearized RGB color space. This assumes that that the scene is essentially Lambertian, i.e., that a set is likely to represent an actual scene point if the radiance samples are densely positioned in the underlying color space.

In one configuration, the sparse representation application may compute the density using iterations of a modified Parzen window estimation with an Epanechnikov kernel, with the initial depth score defined as $$S(u, d) = \frac{1}{|\mathcal{R}(u, d)|} \sum_{r \in \mathcal{R}(u,s)} K(r - \bar{r}), \quad (4)$$

where $\bar{r}=E(u, \hat{s})$ is the radiance value at the current EPI-pixel, and the kernel is $$K(x) = 1 - \left\|\frac{x}{h}\right\|^2 \text{ if } \left\|\frac{x}{h}\right\| \le 1$$

and 0 otherwise. Here, h is the bandwidth parameter and may be set to, e.g., h=0.02. In alternative configurations, other kernels may be used such as Gaussian or other bell-shaped kernels. To reduce the influence of noisy radiance measurements, the sparse representation application may compute an iteratively updated radiance mean $$\bar{r} \leftarrow \frac{\sum_{r \in \mathcal{R}} K(r-\bar{r})r}{\sum_{r \in \mathcal{R}} K(r-\bar{r})}$$

to plug into equation (4). Experience has shown that robustness to noise may be achieved after only a few iterations, e.g., 10 iterations.

For each EPI pixel (u, ŝ), the sparse representation application may compute scores S(u, ŝ) for an entire range of admissible disparities d, and assign the disparity with the highest score as the pixel's depth estimate $$D(u,\hat{s})=\arg\max_d S(u,d). \quad (5)$$

The sparse representation application may further compute a refined confidence $C_d$ as a measure of reliability of the depth estimate. Low-confidence depth estimates may be discarded and marked for re-computation at a later stage. In one configuration, the refined confidence $C_d$ may combine the edge confidence $C_e$ with the difference between the maximum score $S_{max}=\max_d S(u, d)$ and the average score $\bar{S}=\Sigma_d S(u, d)$ $$C_d(u,\hat{s})=C_e(u,\hat{s})\|S_{max}-\bar{S}\|. \quad (6)$$

Note, the refined confidence $C_d$ combines two complementary measures. For example, noisy regions of an EPI would result in a high edge-confidence $C_e$, while a clear maximum $S_{max}$ is not available. Similarly, ambiguous homogenous regions in an EPI, where $C_e$ is low, can produce a strong, but insufficiently unique $S_{max}$. Each confident depth estimate, i.e., D(u, ŝ) where $C_d(u, s) > \epsilon$, may be stored as a line segment tuple l=(m, u, s, $\bar{r}^T$) in Γ, where $\bar{r}$ represents the mean radiance of R(u, d), and m is the slope of the line segment computed from d as m=1/d.

In one configuration, the sparse representation application may apply a median filter on the computed depths to attempt to eliminate the influence of outliers. A straightforward median filter may not result in the precise localization of silhouettes. The sparse representation application may instead use a bilateral median filter that preserves the localization of depth discontinuities by leveraging information from the radiance estimates of nearby EPIs. Such a bilateral median filter may be implemented by replacing depth values $D_v(u, \hat{s})$ with the median value of the set $$\{D_v(u',\hat{s})|(u',v',\hat{s})\in N(u,v,\hat{s}),\|E_v(u,\hat{s})-E_v(u,\hat{s})\|<\epsilon M_e(u',v',\hat{s})=1\}, \quad (7)$$

where (u', v', ŝ)∈N(u, v, ŝ) denotes a small window over $I_{\hat{s}}$ (e.g., a window of size 11×11 pixels), and the color tolerance threshold ϵ is, e.g., ϵ=0.1. Note, increasing the color tolerance ϵ and the kernel bandwidth h, discussed above, compared to other default values increases robustness to noise, whereas small values of ϵ and h preserve finer details. In equation (7), the second condition ensures that only EPI-pixels of similar radiance are considered, and the third condition masks out EPI-pixels lacking confidence for which no depth estimation is available.

At step 450, the sparse representation application propagates the depth estimates to other EPI-pixels. As discussed, each confident depth estimate D(u, ŝ) may be stored as a line segment tuple l=(m, u, s, $\bar{r}^T$) in Γ, where $\bar{r}$ is the mean radiance of (u, ŝ), namely $$\bar{r} \leftarrow \frac{\sum_{r \in \mathcal{R}} K(r-\bar{r})r}{\sum_{r \in \mathcal{R}} K(r-\bar{r})}.$$

In one configuration, the depth estimate may be propagated along the slope of its corresponding EPI line segment to all EPI-pixels (u', ŝ) having a radiance similar to the mean radiance, i.e., $\|E(u', s')-\bar{r}\|<\epsilon$. This is a conservative visibility estimate and ensures that foreground objects in the EPI are not overwritten by background objects during propagation. In an alternative configuration, the sparse representation application may use full mean shift clustering, and propagate the depth estimate to cluster elements. As discussed, the sparse representation application may, after depth estimate propagation, set ŝ to the nearest s with respect to the center of the EPI that still has unprocessed pixels, and so forth, until all edge-confident EPI-pixels have been processes or masked out by propagation.

At step 460, the sparse representation application iteratively downsamples the EPI and repeats, after each downsampling, the determining of edge confidence of step 430, computing of depth estimates of step 440, and propagating of depth estimates of step 450. Parts of the EPI without assigned depth values were either previously ambiguous due to homogenous colors (i.e., insufficient edge confidence), or have strongly view-dependent appearance (i.e., insufficient depth confidence). A fine-to-coarse strategy may be used to compute depth in such less detailed and less reliable regions by exploiting the regularizing effect of an iterative downsampling of the EPI. Further, to enhance robustness and efficiency, the sparse representation application may use previously computed confident depth estimates as depth interval bounds for depth estimation at coarser resolutions.

In one configuration, the sparse representation application may use the upper and lower bounds of the closest reliable depth estimates in each horizontal row of the EPI as the depth bound estimates. Then the sparse representation application may downsample the EPI (e.g., by a factor of 0.5) along the spatial u and v directions, while the resolution along the angular s-dimension is preserved. The sparse representation application may smooth the EPI along the spatial dimensions using, e.g., a 7×7 Guassian filter with standard deviation $\sigma=\sqrt{0.5}$ to avoid aliasing. After downsampling, the sparse representation application may perform edge confidence estimation, depth estimation, and propagation at the coarser resolution. EPI-pixels with reliable depth estimates computed at higher resolutions may not be considered again, aside from being used for deriving the depth bounds discussed above. This fine-to-coarse process may be iterated through all levels of the EPI pyramid until any of the image dimensions becomes less than a given size (e.g., 10 pixels). At the coarsest level, the sparse representation application may assign depth estimates to all pixels regardless of confidence.

At step 470, the sparse representation application successively upsamples depth estimates at coarse resolution levels to the respective higher resolution levels and assigned to the corresponding higher-resolution EPI-pixels without a depth estimate, until all EPI-pixels at the finest resolution level have a corresponding depth estimate. In one configuration, the sparse representation application may remove spurious speckles by, e.g., applying a 3×3 median.

If there are more EPIs, then at step 480, the method 400 returns to step 430, and another EPI is processed.

FIG. 5 depicts a block diagram of a system in which an aspect may be implemented. As shown, the system 500 includes, without limitation, a central processing unit (CPU) 510, a network interface 530, an interconnect 515, a memory 560 and storage 520. The system 500 may also include an I/O device interface 540 connecting I/O devices 550 (e.g., keyboard, display and mouse devices) to the system 500.

The CPU 510 retrieves and executes programming instructions stored in the memory 560. Similarly, the CPU 510 stores and retrieves application data residing in the memory 560. The interconnect 515 facilitates transmission, such as of programming instructions and application data, between the CPU 510, I/O device interface 540, storage 520, network interface 530, and memory 560. CPU 510 is included to be representative of a single CPU, multiple CPUs, a single CPU having multiple processing cores, and the like. In other aspects, one or more graphics processing units (GPUs) may be used in lieu of, or in conjunction with, the CPU 510. And the memory 560 is generally included to be representative of a random access memory. The storage 520 may be, e.g., a disk drive storage device. Further, system 500 is included to be representative of a physical computing system as well as virtual machine instances hosted on a set of underlying physical computing systems. Further still, although shown as a single computing system, one of ordinary skill in the art will recognized that the components of the system 500 shown in FIG. 5 may be distributed across multiple computing systems connected by a data communications network.

As shown, the memory 560 includes an operating system 561 and sparse representation application 562. Illustratively, the operating system may include Microsoft's Windows®. The sparse representation application 562 is configured to determine depth estimates based on light fields and store a sparse light field representation which includes the depth estimates and an error between a reconstruction from the estimates and input light field images. In one configuration, the sparse representation application 562 may store a set Γ of tuples l=(m, u, s, $r^T$) generated from received depth estimates, determine a difference $\Delta E = E - \hat{E}$ between the input EPI E and the reconstruction $\hat{E}$ generated by rendering the line segments described by the tuples l, and store the set Γ and the difference $\Delta E$ as a sparse representation 522 of the light field, according to the method 300 discussed above. In addition, the sparse representation application 562 may itself estimate depth based on given input images 521 by, generating EPIs, determining edge confidence for EPI-pixels, estimating depths of EPI-pixels with high edge confidence, propagating the depth estimates, and repeating this process with iteratively downsampled EPIs, according to the method 400 discussed above.

Although discussed above primarily with respect to a lossless sparse light field representation from which the full light field may be reconstructed, alternative configurations may also apply, e.g., lossy compression to further reduce the size of the representation. An example of such lossy compression is JPEG compression, which may be applied to the difference EPI $\Delta E$.

Although discussed above primarily with respect to a regularly sampled 3D light field, techniques disclosed herein may be readily adapted to other light fields, such as 4D light fields and unstructured light fields. In a regular 4D light field, camera centers are horizontally and vertically displaced, leading to a 4D parametrization of rays as r=L(u, v, s, t), where t denotes the vertical ray origin. The ray sampling of equation (3) may then be extended to $$R(u,v,s,t,d) = \{L(u+(\hat{s}-s)d, v+(\hat{t}-t)d, s, t) | s=1, \ldots, n, t=1, \ldots, m\}, \quad (8)$$

where $(\hat{s}, \hat{t})$ is the considered view and m denotes the number of vertical viewing positions. As a result, sampling may be performed in a 2D plane in a 4D ray space, also referred to herein as a "3D epipolar (plane) volume," as opposed to the 1D line in the case of 3D light fields. The depth propagation may take place along both s- and t-directions. Additionally, the tuples l may represent planes, and be stored together with reconstruction error $\Delta E$, which may be a 3D error epipolar (plane) volume.

For arbitrary, unstructured input (e.g., an unstructured light field or unstructured set of images), camera poses may be estimated to determine the set of sampled rays for a depth hypothesis. For example, camera poses may be estimated, using structure-from-motion techniques, from the input images of a scene that are used to construct a light field. Having the camera poses means that the relative positions and orientations are known of the camera viewpoints for all input images. With this information available, it can be determined where a scene point is projected in each input image, and the pixels collected from those projected positions in input images form the set of sampled rays mentioned above.

In one configuration, each considered pixel may be sent to 3D space in accordance with the hypothesized depth, and then the 3D position may be re-projected to the image coordinate systems of all other views to obtain the sampling positions. The set of sampled rays becomes $$R(u,v,s,d) = \{L(u',v',s) | s=1, \ldots, n, P_s^{-1} [u'v'fd]^T = P_{\hat{s}}^{-1} [uvfd]^T\}, \quad (9)$$

where $P_s$ denotes the camera projection matrix of view s, and f is the camera focal length. The depth estimate may then be depth or disparity maps or any other form of 3D representation/model of the depicted scene, such as a point cloud, triangle mesh, or any other surface representation. Such depth estimates may be stored together with reconstruction error $\Delta E$.

Advantageously, techniques disclosed herein permit light fields having high spatial-angular resolution to be stored in a compact representation that reduces storage space requirements. The compact representation may handle both occlusions and light field variations, storing all relevant information necessary to reconstruct the full light field as well as extract an arbitrary input image with a corresponding depth map, or a full 3D point cloud, among other things. Further, the compact representation enables efficient parallel processing of input light fields, as the full light fields need not be kept in memory.

The foregoing description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and flowchart illustrations, and combinations of blocks in the block diagrams and flowchart illustrations can be implemented by special-purpose hardware-based systems that perform the specified functions or acts, or combinations of special purpose hardware and computer instructions.

While the foregoing is directed to aspects of the present disclosure, other and further aspects may be devised without departing from the basic scope thereof, and the scope thereof is determined by the claims that follow.

What is claimed is:

1. A computer-implemented method for generating and storing a compact representation of a light field, comprising:
   receiving the light field captured as a plurality of images depicting a scene, wherein the light field is one of a three-dimensional (3D) light field and a four-dimensional (4D) light field;
   receiving depth estimates of points in the scene;
   determining an error between a reconstruction from the depth estimates and the received images; and
   storing, in computer storage hardware, the compact representation of the light field which includes the depth estimates and the determined error,
   wherein, when the light field is the 3D light field, the depth estimates include slopes of lines at pixels of epipolar-plane images (EPIs) generated from the plurality of images, the reconstruction includes one or more EPIs generated based on the slopes, and the error is an error between the EPIs generated from the plurality of images and the one or more reconstructed EPIs, and
   wherein, when the light field is the 4D light field, the depth estimates include planes passing through pixels of 3D epipolar (plane) volumes generated from the plurality of images, the reconstruction includes one or more 3D epipolar (plane) volumes generated based on the planes, and the error is an error between the 3D epipolar (plane) volumes generated from the plurality of images and the one or more reconstructed 3D epipolar (plane) volumes.

2. The method of claim 1, wherein, when the light field is the 3D light field, the depth estimates are stored as tuples each representing a respective one of the lines and having form l=(m, u, s, $r^i$), where m is a slope, (u, s) is a point, and r is an average color of the point (u, s) in one of the EPIs.

3. The method of claim 2, wherein the tuples are stored in order of decreasing slope.

4. The method of claim 1, wherein, when the light field is the 4D light field, the depth estimates are stored as tuples l each representing a respective one of the planes.

5. The method of claim 1, wherein the light field further includes an unstructured light field or unstructured set of images, and wherein the depth estimates further include one of a depth map, a disparity map, and a 3D representation or model of the scene associated with the unstructured light field.

6. The method of claim 1, wherein, when the light field is the 3D light field, the received depth estimates of points in the scene are estimated by:
   generating the EPIs from the plurality of images;
   iteratively downsampling the EPIs to coarser resolutions; and
   at each of the iterations, for each of the EPIs:
      determining edge confidence scores for pixels of the EPI,
      determining depth estimates for the pixels of the EPI associated with edge confidence scores above a threshold value, and
      propagating the depth estimates to other pixels of the EPI.

7. The method of claim 1, further comprising, reconstructing the light field based on the stored depth estimates and the stored error.

8. The method of claim 1, further comprising, extracting an image and a corresponding depth map, or a full point cloud, based on the stored depth estimates and the stored error.

9. A non-transitory computer-readable storage medium storing instructions, which when executed by a computer system, perform operations for generating and storing a compact representation of a light field, the operations comprising:
  receiving the light field captured as a plurality of images depicting a scene, wherein the light field is one of a three-dimensional (3D) light field and a four-dimensional (4D) light field;
  receiving depth estimates of points in the scene;
  determining an error between a reconstruction from the depth estimates and the received images; and
  storing, in computer storage hardware, the compact representation of the light field which includes the depth estimates and the determined error,
  wherein, when the light field is the 3D light field, the depth estimates include slopes of lines at pixels of epipolar-plane images (EPIs) generated from the plurality of images, the reconstruction includes one or more EPIs generated based on the slopes, and the error is an error between the EPIs generated from the plurality of images and the one or more reconstructed EPIs, and
  wherein, when the light field is the 4D light field, the depth estimates include planes passing through pixels of 3D epipolar (plane) volumes generated from the plurality of images, the reconstruction includes one or more 3D epipolar (plane) volumes generated based on the planes, and the error is an error between the 3D epipolar (plane) volumes generated from the plurality of images and the one or more reconstructed 3D epipolar (plane) volumes.

10. The computer-readable storage medium of claim 9, wherein, when the light field is the 3D light field, the depth estimates are stored as tuples each representing a respective one of the lines and having form $l=(m, u, s, r^T)$, where m is a slope, (u, s) is a point, and r is an average color of the point (u, s) in one of the EPIs.

11. The computer-readable storage medium of claim 10, wherein the tuples are stored in order of decreasing slope.

12. The computer-readable storage medium of claim 9, wherein, when the light field is the 4D light field, the depth estimates are stored as tuples l each representing a respective one of the planes.

13. The computer-readable storage medium of claim 9, wherein the light field further includes an unstructured light field or unstructured set of images, and wherein the depth estimates further include one of a depth map, a disparity map, and a 3D representation or model of the scene associated with the unstructured light field.

14. The computer-readable storage medium of claim 9, wherein, when the light field is the 3D light field, the received depth estimates of points in the scene are estimated by:
  generating the EPIs from the plurality of images;
  iteratively downsampling the EPIs to coarser resolutions; and
  at each of the iterations, for each of the EPIs:
    determining edge confidence scores for pixels of the EPI,
    determining depth estimates for the pixels of the EPI associated with edge confidence scores above a threshold value, and
    propagating the depth estimates to other pixels of the EPI.

15. The computer-readable storage medium of claim 9, further comprising one of reconstructing the light field based on the stored depth estimates and the stored error and extracting an image and a corresponding depth map, or a full point cloud, based on the stored depth estimates and the stored error.

16. A system, comprising:
  a processor; and
  a memory, wherein the memory includes an application program configured to perform operations for generating and storing a compact representation of a light field, the operations comprising:
    receiving the light field captured as a plurality of images depicting a scene, wherein the light field is one of a three-dimensional (3D) light field and a four-dimensional (4D) light field,
    receiving depth estimates of points in the scene,
    determining an error between a reconstruction from the depth estimates and the received images, and
    storing, in computer storage hardware, the compact representation of the light field which includes the depth estimates and the determined error,
    wherein, when the light field is the 3D light field, the depth estimates include slopes of lines at pixels of epipolar-plane images (EPIs) generated from the plurality of images, the reconstruction includes one or more EPIs generated based on the slopes, and the error is an error between the EPIs generated from the plurality of images and the one or more reconstructed EPIs, and
    wherein, when the light field is the 4D light field, the depth estimates include planes passing through pixels of 3D epipolar (plane) volumes generated from the plurality of images, the reconstruction includes one or more 3D epipolar (plane) volumes generated based on the planes, and the error is an error between the 3D epipolar (plane) volumes generated from the plurality of images and the one or more reconstructed 3D epipolar (plane) volumes.

* * * * *